United States Patent [19]

Pierce, Jr.

[11] 4,138,144

[45] Feb. 6, 1979

[54] WELLHEAD SEALING ASSEMBLY

[75] Inventor: Elwood K. Pierce, Jr., Coldspring, Tex.

[73] Assignee: NL Industries, Inc., New York, N.Y.

[21] Appl. No.: 791,114

[22] Filed: Apr. 26, 1977

[51] Int. Cl.² ............................................. F16L 35/00
[52] U.S. Cl. ......................................... 285/18; 166/85;
    277/235 R; 285/143; 285/315; 285/321;
    285/341; 285/351
[58] Field of Search ................... 285/18, 24, 139, 27,
    285/140, 143, 141, 142, 339, 342, 343, 338, 16
    L, 196, 138, 351, 341, DIG. 11, 356, 348, 144,
    145, 146, 147, 148, 315, 347, 346, 321; 166/82,
    84, 85, 179-183; 277/229, 188 A, 235, 228, 230,
    117, 123-125

[56] References Cited

U.S. PATENT DOCUMENTS

| 2,430,623 | 11/1947 | Taylor et al. | 277/235 X |
| 3,013,830 | 12/1961 | Milligan | 277/230 X |
| 3,118,682 | 1/1964 | Fredd | 277/235 X |
| 3,284,088 | 11/1966 | Pippert | 277/235 X |
| 3,972,546 | 8/1975 | Putch | 285/18 |
| 4,055,205 | 10/1977 | Withoff | 277/229 X |

FOREIGN PATENT DOCUMENTS

| 645135 | 5/1937 | Fed. Rep. of Germany | 285/356 |
| 743959 | 1/1933 | France | 285/356 |
| 1193987 | 5/1959 | France | 277/188 A |

Primary Examiner—Dave W. Arola
Attorney, Agent, or Firm—Fulbright & Jaworski

[57] ABSTRACT

A sealing assembly for sealing the annulus between a wellhead and a casing hanger in which the assembly includes a recess for receiving a sealing element in which the recess includes a tapered surface and a tapered seat for coacting with a seal for setting the seal with a small setting force. A resilient sealing element is positioned in the recess and tapers downwardly and outwardly at a lower end. The sealing element is compressed in the recess to form a seal requiring only a low seating load and unseats with a low unseating load. An expandable metal ring is positioned in the lower outside portion of the sealing element to reduce extrusion of the element when set. A non-extrusive protective covering is positioned around the top, the outside and the outer portion of the bottom of the sealing element to protect it as it moves downhole in a well. Various seal modifications provide wedge actuated lip seals to increase the sealing area.

9 Claims, 14 Drawing Figures

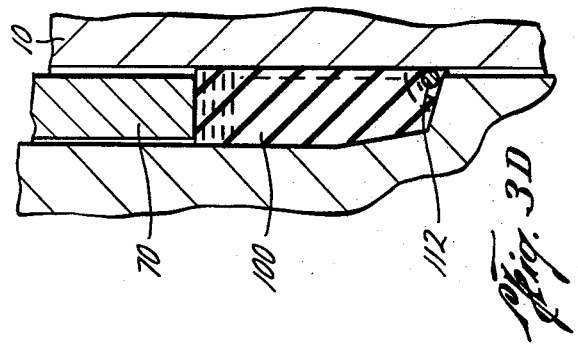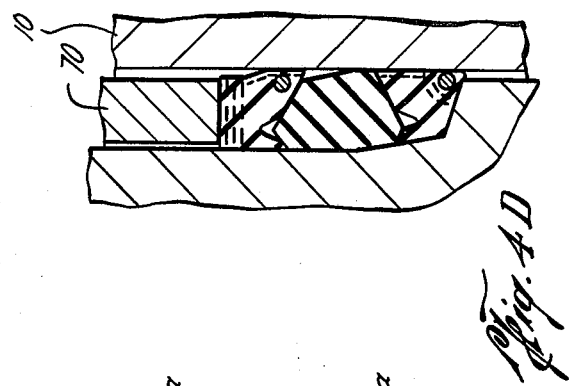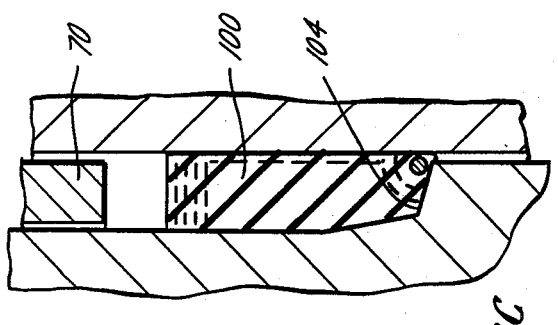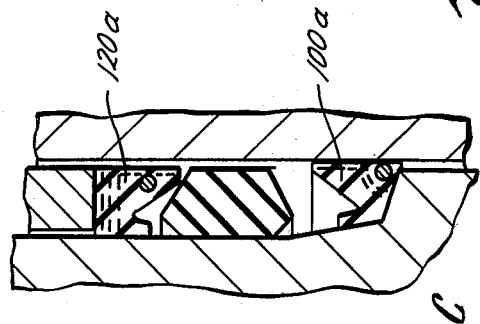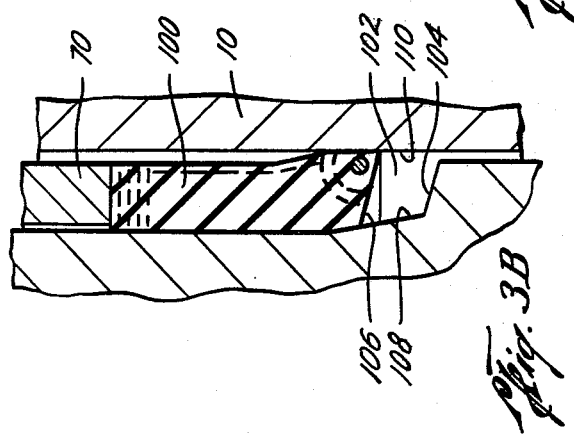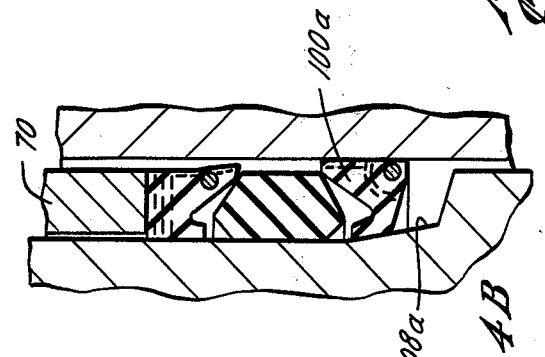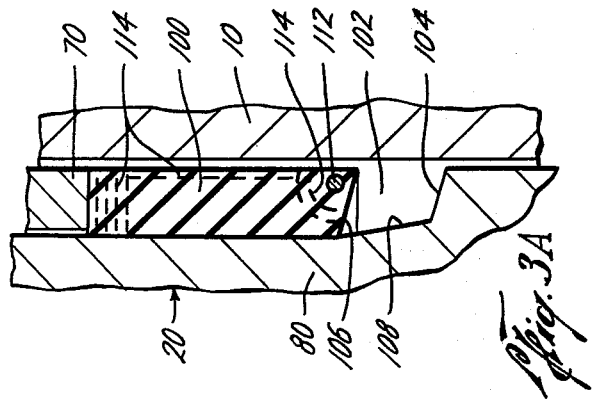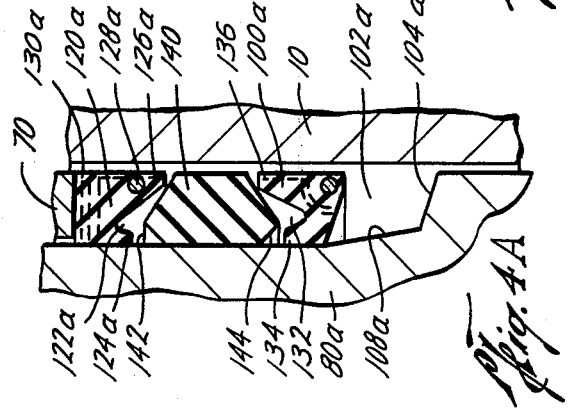

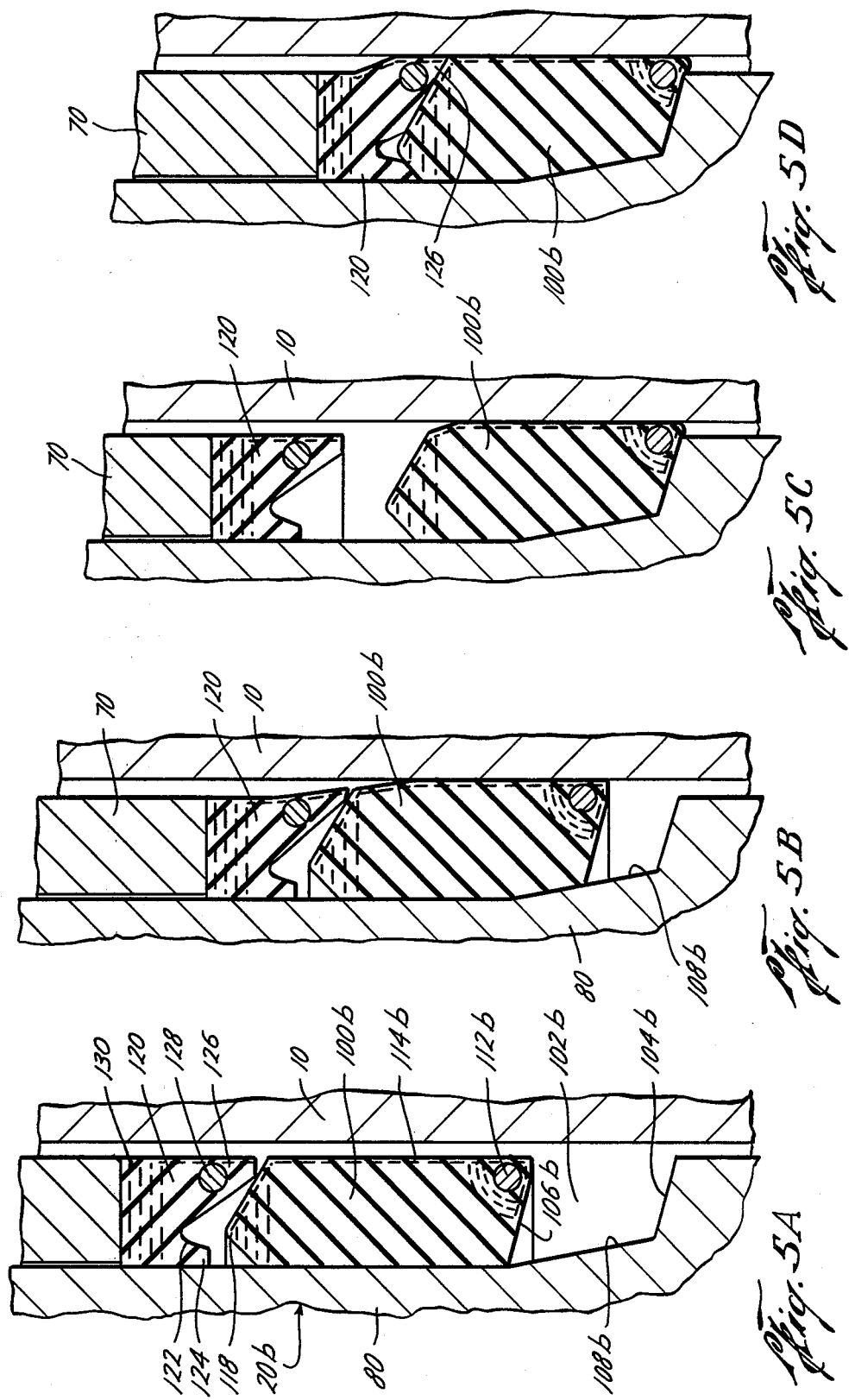

WELLHEAD SEALING ASSEMBLY

BACKGROUND OF THE INVENTION

Generally, a fluted casing hanger is used to support casing inside a wellhead. The annulus between the outside of the fluted casing hanger and the inside of the wellhead must be sealed off. It is old, as shown in U.S. Pat. No. 3,972,546, to use a resilient squeeze-type sealing element that is locked into the annulus and squeezed into a sealing relationship. However, in the past, the seal assembly required high forces to set the seal into a sealing position. Furthermore, when the seal was squeezed into a sealing relationship the resilient seal was frequently extruded out of the sealing area. And frequently the soft resilient seal was damaged when moving downhole in a well.

The present invention is directed to an improved sealing assembly and seal which overcomes the above-named problems as well as having the ability to set a seal into a sealing position with less actuating force, has a seal which retains energy or spring-back, has the ability to be retracted with low unseating load, and the ability to move the seal into first sealing position with a low loading and thereafter allowing the hydraulic pressure used in the seal test to move the seal to a final seating position.

SUMMARY

An object of the present invention is the provision of a sealing assembly for sealing the annulus between a wellhead and a casing hanger which is simple to manufacture and operate, but is capable of withstanding high fluid or gas pressures and which remains effectively operative during a long period of service. The sealing assembly includes a recess for receiving a sealing element in which the recess includes an upwardly directed shoulder which is tapered downwardly and outwardly, and the recess further includes a portion adjacent the shoulder which tapers outwardly and downwardly. Therefore, when a sealing element is moved into a setting position adjacent the shoulder, the seal is compressed into a smaller area to provide a sealing force greater than the vertical load required to set the seal. In addition, once the seal is only partially moved into sealing position, hydraulic pressure may be applied to move the seal to a final sealing position and test at the same time.

A further object of the present invention is the provision of a resilient sealing element adapted to be positioned in the recess in which the lower end of the resilient element tapers outwardly and downwardly to coact with the recess to move radially into a set position.

A further object of the present invention is the provision of providing an extrudible metal ring encased in the lower outside corner of the seal for restricting the extrusion of the resilient sealing element when it is set.

Still a further object of the present invention is the provision of a non-extrusion protective covering such as layers of fabric bonded to the resilient material on the top, outside and the outer portion of the bottom for protecting the resilient element from damage as it moves downwardly through the well bore and blowout preventer.

A still further object of the present invention is the provision of additional sealing elements having recesses with lips on either side into which a wedge is pressed to form additional lip-type sealing areas to further enhance the sealing ability of the seal.

Other and further objects, features and advantages will be apparent from the following description of presently preferred embodiments of the invention, given for the purpose of disclosure and taken in conjunction with the accompanying drawings.

BRIEF DESCRIPTION OF THE DRAWINGS

FIGS. 3A, 3B, 3C and 3D, are enlarged fragementary elevational views, in cross section, showing the seating sequence of the seal shown in FIGS. 1 and 2, FIGS. 4A, 4B, 4C and 4D are enlarged fragementary elevational views, in cross section, of the sealing sequences of a modification of the seal element of the present invention, and FIGS. 5A, 5B, 5C and 5D are enlarged fragementary elevational views, in cross section, of the sealing sequences of a further embodiment of the seal of the present invention.

DESCRIPTION OF THE PREFERRED EMBODIMENT

While the sealing assembly and seal of the present invention may be locked in place and set by various types of mechanisms, for purposes of illustration only, the present invention will be described as used in conjunction with the locking and setting mechanism illustrated in U.S. Pat. No. 3,972,546.

Figure 1:
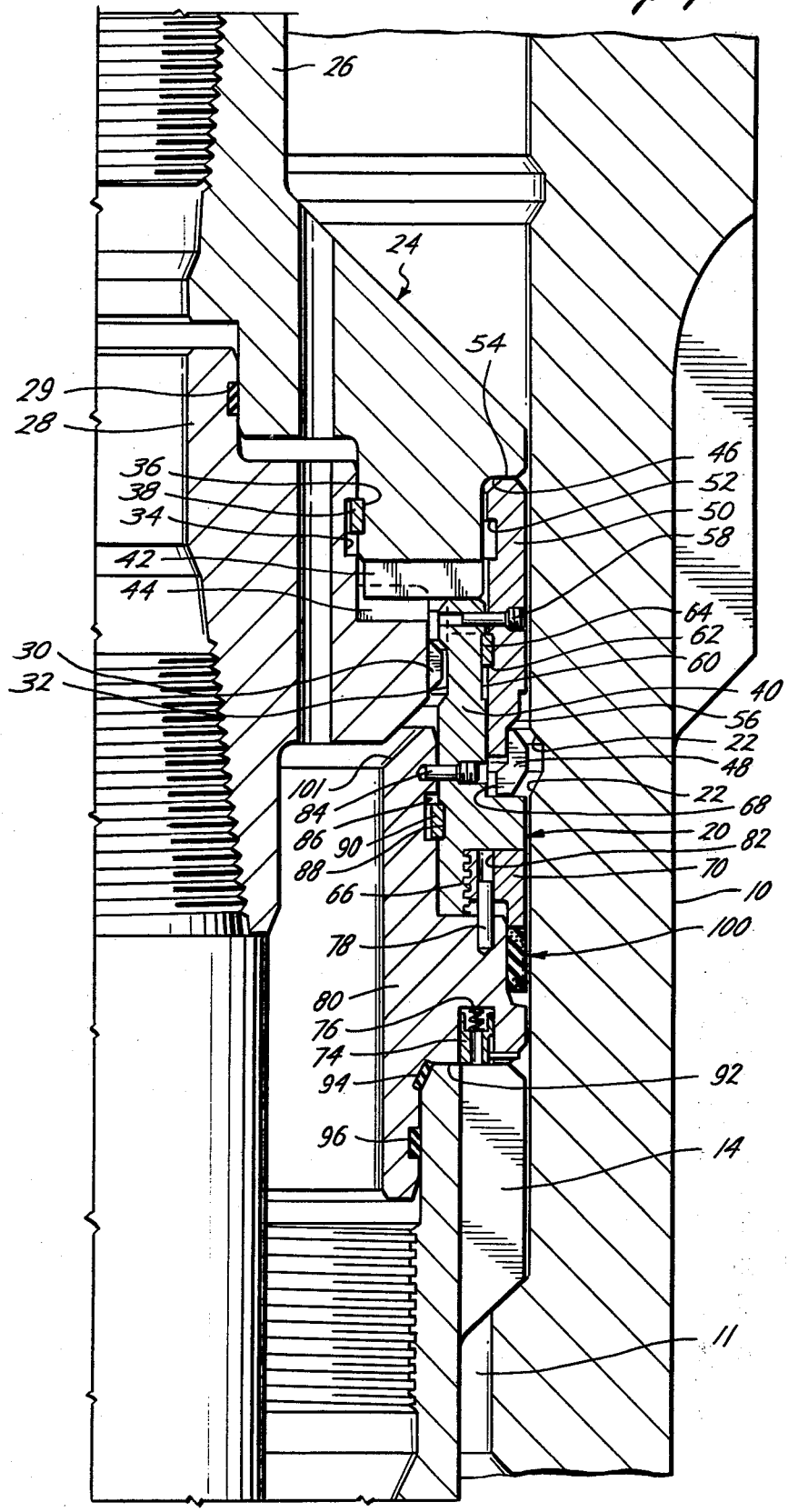
FIG. 1 is a fragmentary elevational view, in cross section, showing a sealing assembly of the present invention for sealing between the annulus between a wellhead and a casing hanger, here shown being run, but in the unlocked and unset position.
Figure 2:
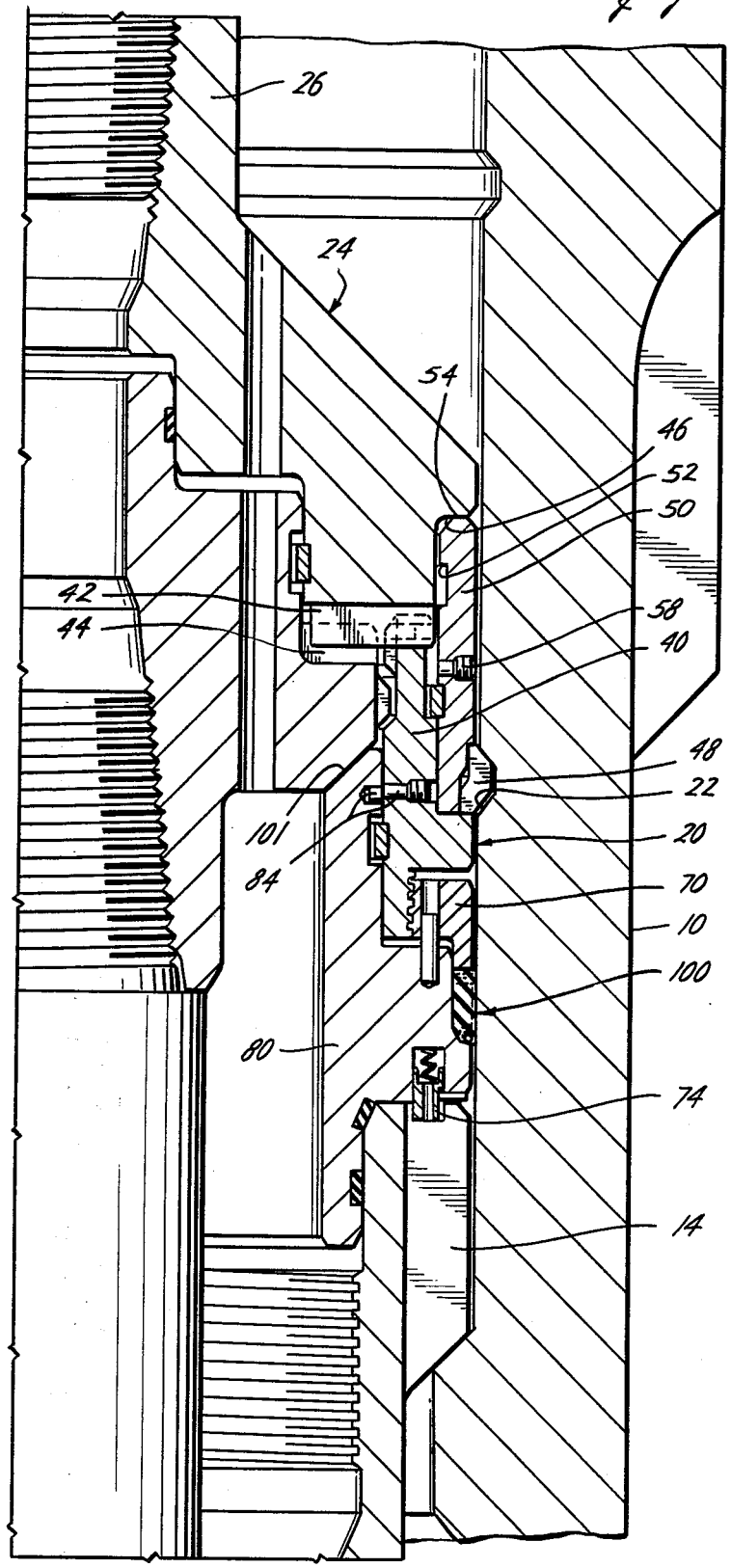
FIG. 2 is a fragmentary elevational view, in cross section, similar to FIG. 1, showing the seal assembly locked in place and set.

Referring now to FIGS. 1 and 2, the improved sealing assembly of the present invention, generally indicated by the reference numeral 20, is used for sealing off the annulus 11 between a wellhead 10 and a casing hanger 14 by being locked into a locking notch 22 on either the wellhead 10 or the casing hanger 14, here shown as on the wellhead 10. The sealing assembly 20 is run into the wellhead 10 by means of a running and testing tool generally indicated by the reference numeral 24 which includes a first portion 26 supported from a drill pipe (not shown) and a second portion 28. The seal assembly 20 is supported from the running and testing tool 24 from a plurality of lugs 30 connected to second portion 28 which are inserted into a non-threaded engaging means such as J slot 32 in a first member 40 of the seal assembly 20. The portions 26 and 28 are longitudinally connected together by limited lost motion longitudinal connection consisting of an annular slot 34 on portion 28, an annular slot 36 on portion 24 and a ring 38. The portions 26 and 28 include coacting surfaces for imparting rotation therebetween such as splines 42 on portion 26 and coacting grooves 44 on portion 28. In addition, portion 24 includes downwardly directed shoulder 46 for setting a locking sleeve 50.

The seal assembly 20 is shown in its running position in FIG. 1 in which the parts are shown unlocked and the seal or seal element 100 unenergized. The seal assembly 20 includes an annular spring locking dog 48 which is aligned with the locking notch 22 when the seal assembly 20 is seated on the fluted casing hanger 14.

A locking sleeve 50 is positioned for longitudinal movement toward and away from the back side of the locking dog 48 and may include a downwardly directed shoulder 52 for engaging with a retrieving tool for moving the sleeve upwardly. The sleeve 50 includes an upwardly directed shoulder 54 for engagement with the shoulder 46 on the tool 24 for moving the sleeve 50 downwardly against the back side of the locking dog 48 whereby the dog 48 is driven into engagement with the locking notch 22 by means of a coacting surface between the sleeve 50 and the back side of a dog 48, such as surface 56 on the sleeve 50 which may be a wedge surface, if desired.

Initially, the locking sleeve 50 and the first member 40 are secured together by a shear pin 58 for holding the locking sleeve 50 in the retracted position until it is actuated by the tool 24. The locking mechanism includes a limited longitudinal lost motion connection between the sleeve 50 and the first member 40 such as an annular slot 60 on member 40, an annular slot 62 on sleeve 50 and a ring 64 positioned in the slots 60 and 62. This lost motion connection allows the locking sleeve 50 to be moved into a locking position and retracted therefrom, will allow rotative movement to be imparted to first member 40, and yet prevents disengagement of members 50 and 40, and allows ease of retrieval of the seal assembly 20 solely by a longitudinal pull on the locking sleeve 50. The first member 40 is telescopically positioned relative to the sleeve 50 to allow both longitudinal and rotational movement therebetween.

The seal assembly 20 includes a second member 70 with a left-handed threaded connection 66 between the first member 40 and the second member 70. The first member 40 includes an abutting shoulder 68 abutting the bottom of the locking dog 48 for longitudinally preventing upward movement of the member 40 when the dog 48 is locked in position in groove 22. Right-hand rotation of the member 40 will move the second member 70 downwardly to squeeze a resilient seal 100 between the wellhead 10 and a third member 80 of the sealing assembly 20. Third member 80 is provided which includes suitable means for resisting rotation, such as a pin 74, which is urged downwardly by a spring 76 between the flutes of the fluted casing hanger 14 in order to prevent rotation of the second member 70 when the first member 40 is rotated. In order to prevent rotation of the member 70, means are connected between the third member 80 and the second member 70 allowing relative longitudinal motion therebetween for squeezing the seal 100 but preventing rotational movement between the members 70 and 80 such as pin 78 secured in member 80 and connected to member 70 by a longitudinal slot 82. Preferably, a shear pin 84 is provided between the first member 40 and the third member 80 in order to initially secure the third member 80 to the assembly 20. To allow the resilient seal 100 to be released and retracted by a longitudinal movement of member 70 relative to member 80 without the members becoming detached, a limited lost motion connection is provided between the third member 80 and one of the members 40 and 70 such as 40 by providing a limited longitudinal lost motion connection such as slot 86 in member 80, slot 88 in member 40 and ring 90.

The third member 80 also provides a sealing contact with the top of the fluted casing hanger 14 by either or both of a metal-to-metal seal 92 or one or more resilient seals 94 or 96 which engage the casing hanger 14.

The setting of the seal assembly 20 is best seen from FIG. 2 in which the seal assembly 20 is attached to the running and testing tool 24 from a drill pipe (not shown) and set down on top of the fluted casing hanger 14. If the spring-loaded pin 74 is not positioned in between flutes of the fluted hanger 14, as shown in FIG. 1, the pin 74 will slide off of the top of the flutes and into the space therebetween, as shown in FIG. 2, when rotation is applied to the assembly 20. Setting down on the seal assembly 20 by the tool 24 and rotating causes shoulder 46 on the tool 24 to move sleeve member 50 downwardly shearing pin 58 and moving the sleeve 50 to a position behind the locking dog 48 causing the locking dog 48 to lock in the locking notch 22. At the same time right-hand rotation is applied to the tool 24 whereby rotation is supplied from tool portion 26 to tool portion 28 through the spline 42 and groove 44 connections and in turn to the first member 40 through the lugs 30 and J slot grooves 32. This also aligns lugs 30 in grooves 32 to permit separation of tool assembly 24 from pack-off assembly 20. Rotation of member 40 shears pin 84 and screws the second member 70 downward to compress the resilient seal 100, effecting a seal in the annulus 11 between the wellhead 10 and the casing hanger 14.

Generally, a sealing assembly 20 having locking means for locking the assembly in an annulus and seal actuating means for moving a seal into a set position is illustrated in U.S. Pat. No. 3,972,546. The present invention is directed to an improved sealing assembly in which the seal may be moved into a final set position with a minimum of vertical setting force supplied thereto, the ability to be moved to a set position by hydraulic pressure, the ability to be run downhole without damage, and the ability to reduce extrusion of the resilient seal.

Referring now to FIG. 3A, an enlarged view of the seal or sealing element 100, shown in the run-in and unergized position, as in FIG. 1, is best shown. A recess 102 is provided in the sealing assembly 20 such as in member 80 in which the tubular resilient sealing element 100 is positioned. The recess 102 includes at its lower end an upwardly directed shoulder 104 which tapers downwardly and outwardly, preferably at an angle of approximately fifteen degrees from the horizontal, and on which the sealing element 100 seats when it is set. The recess 100 also includes a portion 108 adjacent to the shoulder 104 which tapers outwardly and downwardly, preferably at an angle of about ten degrees from the vertical. It is also noted that the resilient sealing element 100 at its lower end 106 tapers outwardly and downwardly, preferably at an angle of fifteen degrees.

Referring now to FIG. 3B, it is noted that when the sealing element 100 is partially moved into a sealing position, that is, when the lower end 106 moves into the restricted portion of the recess 102 formed by the tapering portion 108 that the element 100 is distorted radially so that it forms both an inner and an outer seal between the surfaces 108 and interior 110 of the wellhead 10. The sealing element 100 may, after it has moved to the position shown in FIG. 3B, be further energized to a final set position (FIG. 3D) by continued movement of the member 70 or other hydraulic or mechanical means. Because of the tapered surfaces 108, 106 and 104, the sealing element 100 in a compressed position has a sealing or side motion force of 5.7 to one ratio over the vertical load required to set the sealing element 100.

Once the seal is set in a partially sealed position as in FIG. 3B, the seal assembly 20 may be actuated to mechanically move the member 70 downwardly to move the sealing element 100 into the final set position as shown in FIG. 3D. However, it is conventional to test a sealing element 100 by pumping a fluid down the annulus 11 and onto the top of the sealing assembly 20 to determine if the seal assembly leaks or holds the desired pressure. Once the sealing element 100 is moved to a partially set position as shown in FIG. 3B, the hydraulic pressure used to test the seal 100 may also be applied to the top of the sealing element 100 which has the effect of moving the sealing element 100 into the set position by the testing fluid as best seen in FIG. 3C. Therefore, the testing fluid would be used to move the seal 100 into the final seating position against the shoulder 104 as well as to test the sealing element 100. After the element 100 has been moved into the final seating position, the member 70 would then be actuated to move down on top of the element 100 to hold it in a secure position as shown in FIG. 3D.

Another problem that occurs in setting a resilient seal such as shown in U.S. Pat. No. 3,972,546 is that the resilient seal will be extruded out of the desired sealing area and fail to hold the desired pressure. The sealing element 100 is provided with an expandable metal ring preferably a soft wrought iron ring 112, adjacent the lower outside corner of the element 100 which restricts the extrusion of the sealing element 100 by preventing the resilient material from being forced beyond the shoulder 104 into the annulus 11.

The resilient sealing element 100 is preferably made out of any nitrile rubber. It has been found that it is preferred to cover portions of the element 100 with a protective covering which reduces extrusion as well as protects the resilient element 100 from damage as it is moved down a well pipe and through various equipment such as blowout preventers. Preferably, the element 100 includes a protective covering 114 on the top, the outside, and the outer portion of the bottom of the element 100. One suitable type of suitable covering is a fabric covering such as duck, cotton, nylon or polyester in which several layers are bonded to the element 100.

Other and further modifications may be made as best seen in FIGS. 4A through 4D and 5A through 5D, respectively, wherein like parts to those in FIGS. 3A through 3D are identified with like numbers with the addition of the suffixes "a" and "b", respectively.

Referring now to FIGS. 5A through 5D, the recess 102b and the sealing element 100b are identical with the embodiment shown in FIGS. 3A through 3D with the exception that the sealing element 100b includes a wedge 118 on the top of the element 100b between the inside and outside of the element 100b in which the wedge 118 is directed upwardly. A second tubular resilient sealing element 120 is provided which includes a recess 122, preferably an inverted V-shaped recess, on the bottom between the inside and outside of the second element 120. The recess 122 separates the bottom of the sealing element 120 into two sealing lips 124 and 126. The recess 122 is positioned to engage and coact with the wedge 118 of the seal 100b when the second element 120 is moved against the first element 100b, as best seen in FIG. 5D, thereby causing the lips 124 and 126 to move radially inwardly and outwardly, respectively, into a sealing contact. While the inside lip 124 will be protected as the sealing assembly 20b is moved downhole, it is preferable that an extrudible metal ring, preferably a soft wrought iron ring 128, is positioned in the lip 126, thereby holding the lip 126 in a retracted position, and preventing it from engaging and from becoming damaged as it is moved downhole during installation. Preferably, the second sealing element 120 also includes a protective fabric covering 130 on the top and outside.

In FIG. 5A, the sealing elements 100b and 120 are shown in the unset and running position. In FIG. 5B, the member 70 has been actuated downwardly against the second element 120, pushing the second element 120 and the first element 100b downwardly, until the first element 100b engages the tapered portion 108b and is distorted radially outwardly to sealingly engage the portion 108b of the member 80 and the inside of the wellhead 10. If desired, the sealing elements 120 and 100b may be moved into final set position, as shown in FIG. 5D, by further actuation of the member 70. Or, upon testing of the seals after position shown in FIG. 5B is reached, hydraulic pressure may be pumped down the annulus to force the first seal member 100b into a final set position as best seen in FIG. 5C and thereafter element 120 is removed to the final set position by actuation of member 70.

Referring now to FIGS. 4A through 4D, a further embodiment of the seal is shown in which two separate lip members are provided for additional sealing areas. In this embodiment, the first tubular resilient sealing means 100a includes a recess 132, preferably a V-shaped recess, thereby forming lips 134 and 136 on either side. A second tubular resilient sealing element 120a is provided above the first element 100a and is identical to the element 120 described in connection with FIGS. 5A through 5D. A wedge member 140 is positioned between the first member 100a and the second member 120a and the wedge member 140 includes a wedge 142 at the top and a wedge 144 at the bottom between the inside and outside of the member 140. The wedges 142 and 144 coact with the recesses 122a and 132, respectively, for moving the lips 124a, 126a, 134, and 136, into a sealing relationship upon setting of the seal. As best seen in FIG. 4A, the seal elements are in the run-in and unenergized position. As shown in FIG. 4B, the actuator 70 has moved downwardly to force the first resilient sealing element 100a into the tapered portion 108a and into a sealing relationship. Continued downward movement of the member 70 can be used to further compress the sealing elements to bring them into a final set position as shown in FIG. 4D, or the first sealing element 100a may be moved into a final set position (FIG. 4C) by the hydraulic test pressure as previously described, after which the upper or second sealing member 120a may be moved down into a final set position as best seen in FIG. 4D by member 70. As best seen in FIG. 4D, the wedging sealing action in the lower end of the recess 102a is obtained as well as any additional sealing by the lips 124a, 126a, 134 and 136.

The present invention, therefore, is well adapted to carry out the objects and attain the ends and advantages mentioned as well as others inherent therein. While presently preferred embodiments of the invention are given for the purpose of disclosure, numerous changes in the details of construction and arrangement of parts may be made which will readily suggest themselves to those skilled in the art and which are encompassed within the spirit of the invention and the scope of the appended claims.

What is claimed is:

1. A sealing assembly for sealing the annulus between a wellhead and a casing hanger comprising,
   locking means connected to the assembly for locking the assembly in said annulus,
   said assembly including a recess for receiving a sealing element, said recess including an upwardly directed shoulder against which a sealing element is set, said shoulder being tapered downwardly and outwardly, said recess including a portion adjacent said shoulder tapering outwardly and downwardly for providing a restricted area for receiving a sealing element,
   a tubular resilient sealing element having a cylindrical inside and outside surface positioned in said recess whereby the tubular portion positioned in the restricted area is compressed to provide a seal, said element at its lower end tapering outwardly and downwardly, said element including a metal ring adjacent the lower outside corner of said seal for restricting the extrusion of the resilient sealing element between the wellhead and a casing hanger,
   seal actuating means connected to the assembly for moving the sealing element into a sealing position,
   said resilient sealing element including a wedge on the top between the inside and the outside of the element, said wedge being directed upwardly,
   a second resilient sealing element positioned on top of the first sealing element, said second element including a recess on the bottom between the inside and the outside of the second element for coacting with the wedge for compressing the second element outwardly and inwardly when the second element is moved against the first element and said second resilient sealing element includes a metal ring adjacent the lower outside corner for holding the lower outside corner inwardly as the sealing assembly is moved downwardly in a well.

2. The apparatus of claim 1 wherein the tops and outsides of both the first and second resilient sealing elements include a protective covering.

3. The apparatus of claim 1 wherein the top of the second element and the outsides of both the first and second resilient sealing elements include a protective covering.

4. A sealing assembly for sealing the annulus between a wellhead and a casing hanger comprising,
   locking means connected to the assembly for locking the assembly in said annulus,
   said assembly including a recess for receiving a sealing element, said recess including an upwardly directed shoulder against which a sealing element is set, said shoulder being tapered downwardly and outwardly, said recess including a portion adjacent said shoulder tapering outwardly and downwardly for providing a restricted area for receiving a sealing element,
   a tubular resilient sealing element having a cylindrical inside and outside surface positioned in said recess whereby the tubular portion positioned in the restricted area is compressed to provide a seal, said element at its lower end tapering outwardly and downwardly, said element including a metal ring adjacent the lower outside corner of said seal for restricting the extrusion of the resilient sealing element between the wellhead and a casing hanger,
   seal actuating means connected to the assembly for moving the sealing element into a sealing position,
   said resilient sealing element including a recess between the inside and the outside of the top,
   a second resilient sealing element positioned above the top of the first sealing element, said second element including a recess on the bottom between the inside and the outside of the second element and a metal ring adjacent the lower outside corner for holding the lower outside corner inwardly as the sealing assembly is moved downwardly in a well, and
   a wedge member positioned between the first and second sealing elements, said wedge member having a wedge at the top and bottom between the inside and the outside of said member, said wedges coacting with said recesses when the sealing elements are set thereby causing said sealing elements to seal radially inwardly and outwardly.

5. A seal for use in a sealing assembly for sealing the annulus between a wellhead and a casing hanger, comprising,
   a first resilient tubular sealing element, and said element at its lower end tapering outwardly and downwardly,
   an expandable metal ring positioned adjacent the lower outside corner of said element,
   said first element including a wedge on the top between the inside and outside of the first element, said wedge being directed upwardly,
   a second resilient tubular sealing element adapted to be positioned above the first element, said second element including a recess on the bottom between the inside and the outside of the second element for coacting with the wedge for compressing the second element radially outwardly and inwardly when the second element is moved against the first element,
   the second sealing element includes a metal ring adjacent the lower outside corner for holding the lower outside corner inwardly as the seal is moved downwardly in a well.

6. The apparatus of claim 5 wherein the tops and the outsides of both the first and second sealing elements include a protective covering.

7. The apparatus of claim 6 wherein the protective covering includes layers of fabric bonded to the sealing elements.

8. A resilient seal for use in a sealing assembly for sealing the annulus between a wellhead and a casing hanger comprising,
   a first resilient tubular sealing element, said element at its lower end tapering outwardly and downwardly,
   an expandable metal ring positioned adjacent the lower outside corner of said first element,
   said first element including a recess on the top,
   a second resilient tubular sealing element adapted to be positioned above the first element, said second element including a recess on the bottom between the inside and the outside of the second element, and
   a wedge member adapted to be positioned between the first and second sealing elements, said wedge member having a wedge at the top and bottom between the inside and the outside of said member, said wedges adapted to coact with the said recesses when the sealing elements are set thereby causing said sealing elements to seal radially inwardly and outwardly,
   said second resilient sealing element includes a metal ring adjacent the lower outside corner for holding the lower outside corner inwardly as the sealing assembly is moved downwardly in a well.

9. The apparatus of claim 8 wherein the top of the second element and the outsides of both the first and second resilient sealing elements includes a protective covering.

* * * * *